Apr. 17, 1923.

G. A. BRUHN 1,451,759

AUTOMATIC WEIGHING APPARATUS FOR LOOSE MATERIALS

Filed Dec. 3, 1920     5 Sheets-Sheet 1

Inventor
Gustav A. Bruhn
By Knight Bros
Attys

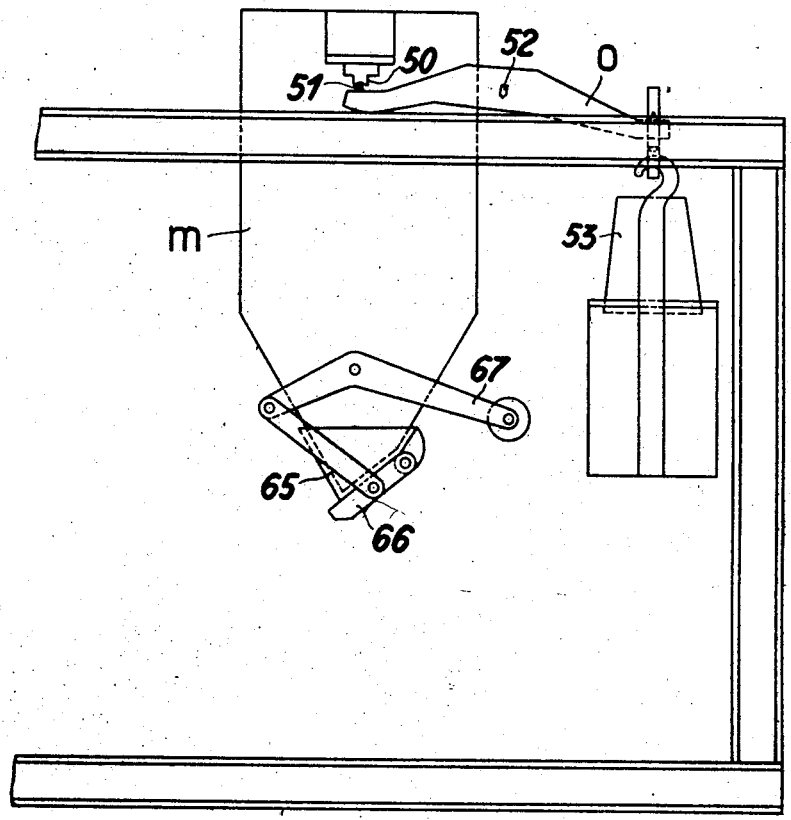

Patented Apr. 17, 1923.

1,451,759

UNITED STATES PATENT OFFICE.

GUSTAV A. BRUHN, OF HARBURG-ON-THE-ELBE, GERMANY, ASSIGNOR TO FRIED. KRUPP AKTIENGESELLSCHAFT, OF ESSEN-ON-THE-RUHR, GERMANY.

AUTOMATIC WEIGHING APPARATUS FOR LOOSE MATERIALS.

Application filed December 3, 1920. Serial No. 428,114.

*To all whom it may concern:*

Be it known that I, GUSTAV A. BRUHN, residing at Harburg-on-the-Elbe, Germany, a citizen of the German Republic, have invented a certain new and useful Improvement in Automatic Weighing Apparatus for Loose Materials, of which the following is a specification.

The invention relates to automatic weighing apparatus for loose substances, including liquids, in which the control of the filling and emptying devices for the weighting receptacle is effected by means of a cam shaft, which is coupled by the weighing receptacle temporarily to a continuously revolving driving shaft. The subject matter of the invention is constituted by a weighing apparatus of the kind mentioned, in which the arrangement which couples the cam shaft to the driving shaft is constructed in a manner which is particularly suited to the purpose.

An automatic weighing apparatus for the manufacture of superphosphate from crude phosphate and sulphuric acid is shown in the drawing as a constructional example of the subject matter of the invention.

Figure 5 is a front elevation of another portion of the apparatus.

Figure 1:
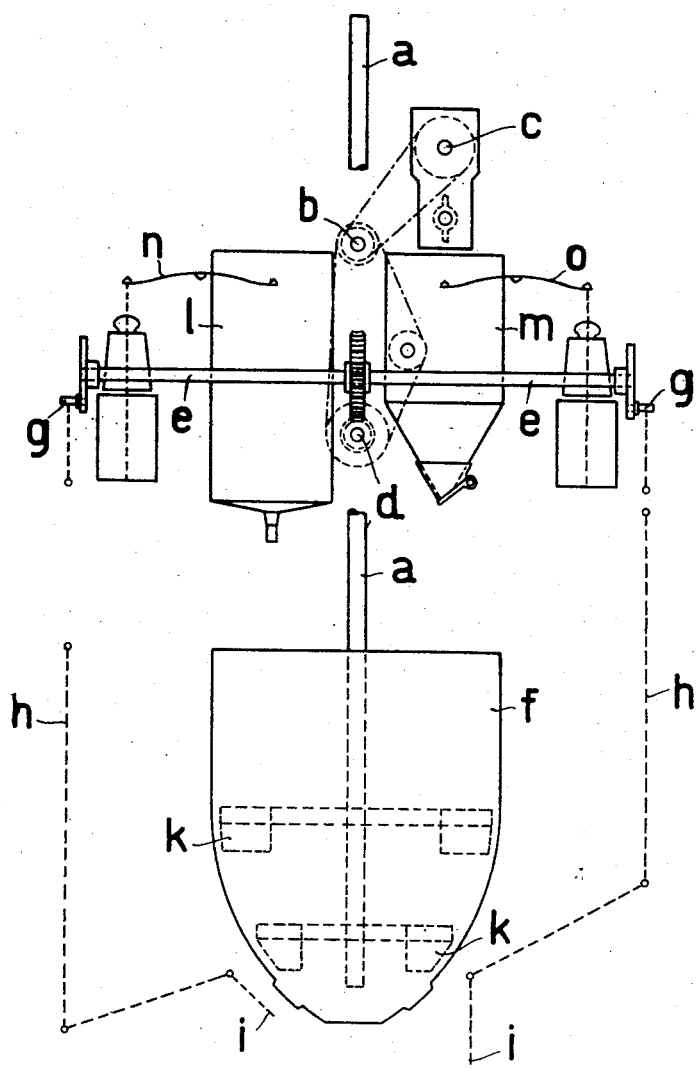
Figure 1 is a diagrammatic representation of the apparatus with the stirring receptacle belonging thereto.

The general arrangement of the apparatus as diagrammatically represented in Figure 1 will be described first.

$a$ represents a continuously revolving main shaft, which sets a counter shaft $b$ in motion by means of bevel wheels for example, which counter shaft is connected by chain transmission with the charging apparatus of the phosphate meal receptacle, which consists of a vane wheel mounted on a shaft $c$.

The counter shaft $b$ is also connected by means of a chain drive which is provided with a tightening device of any desired kind, such for example as a third wheel for tightening the chain, with a shaft $d$ located beneath, hereinafter termed the worm shaft, which shaft has upon its continuously revolving axis a loose worm. The coupling of the worm to the shaft may be effected in any desired manner, in the present case it being effected by means of a jaw clutch. The worm shaft $d$, as soon as it itself comes into action, sets another shaft, the controlling shaft $e$ mounted transversely in the example of construction, in rotation, which it does by means of a toothed wheel mounted on the said controlling shaft and permanently gearing with the loose worm.

The controlling shaft $e$ carries a series of cams and by means thereof effects the operation of the charging and discharging devices of the receptacles.

The controlling shaft $e$ hereinafter referred to as the cam shaft is also connected to a stirring receptacle $f$, and effects by means of the crank pins $g$ and rods $h$ the opening and closing of the discharging doors $i$ of the said stirring receptacle. In the drawing two discharging doors are shown, of which always one comes into operation, according as one or the other of the two collecting receptacles located under the stirring vessel is filled. Into the stirring receptacle projects the main shaft $a$ and carries the stirring vanes $k$ so that the latter like the shaft are constantly in motion.

In the present example of construction two weighing receptacles, namely $l$ and $m$ are provided, the first one for the sulphuric and the latter for the phosphate meal.

The weighing apparatus proper and the connection between these receptacles and indirectly the releasing apparatus for the worm shaft $d$ and also at the same time for the controlling shaft $e$ are represented by the scale beams $n$ and $o$.

The apparatus will now be described more fully.

Figure 2:
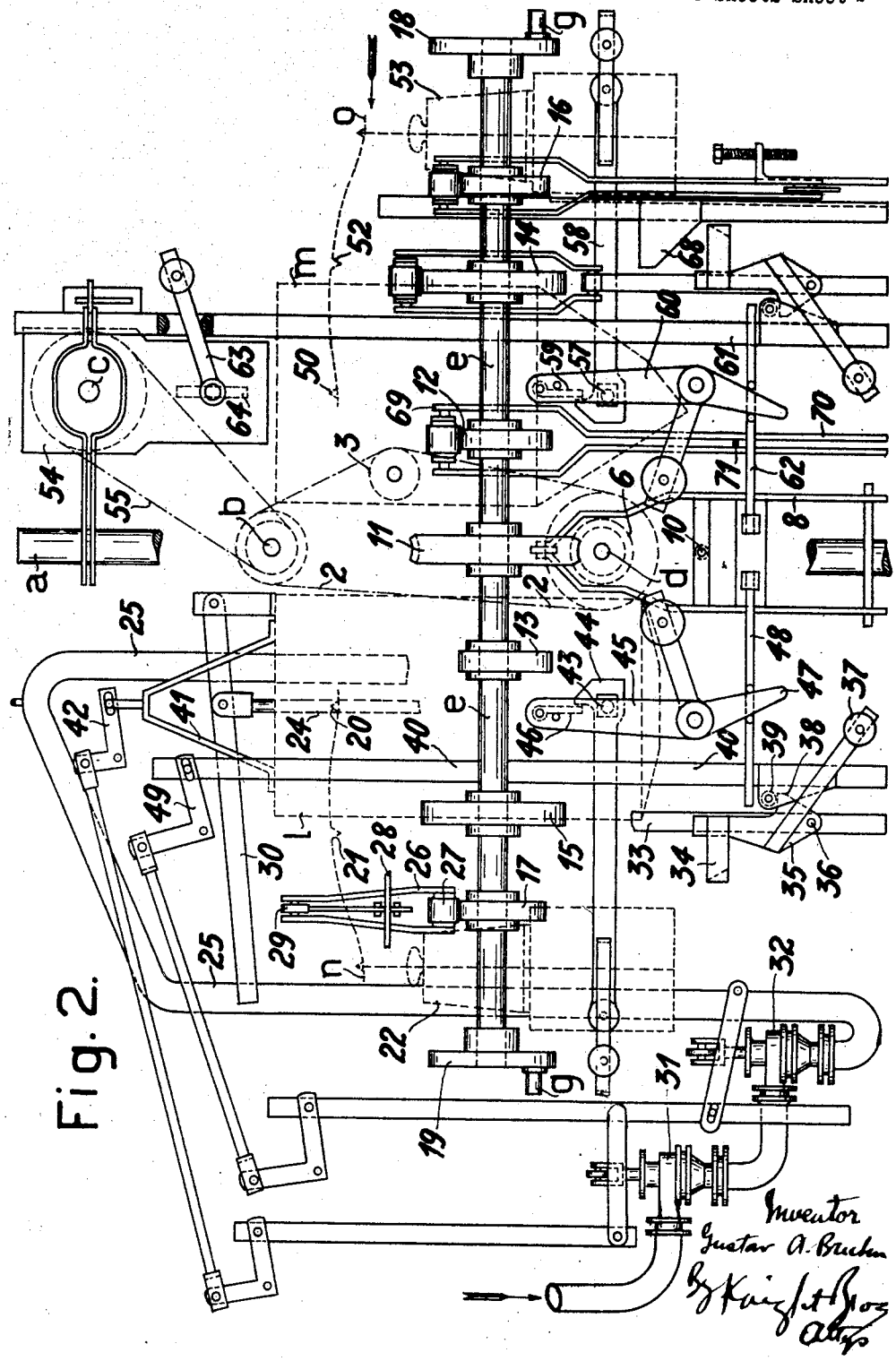
Figure 2 is a front elevation of the apparatus, certain parts being broken away and certain parts omitted.
Figure 3:
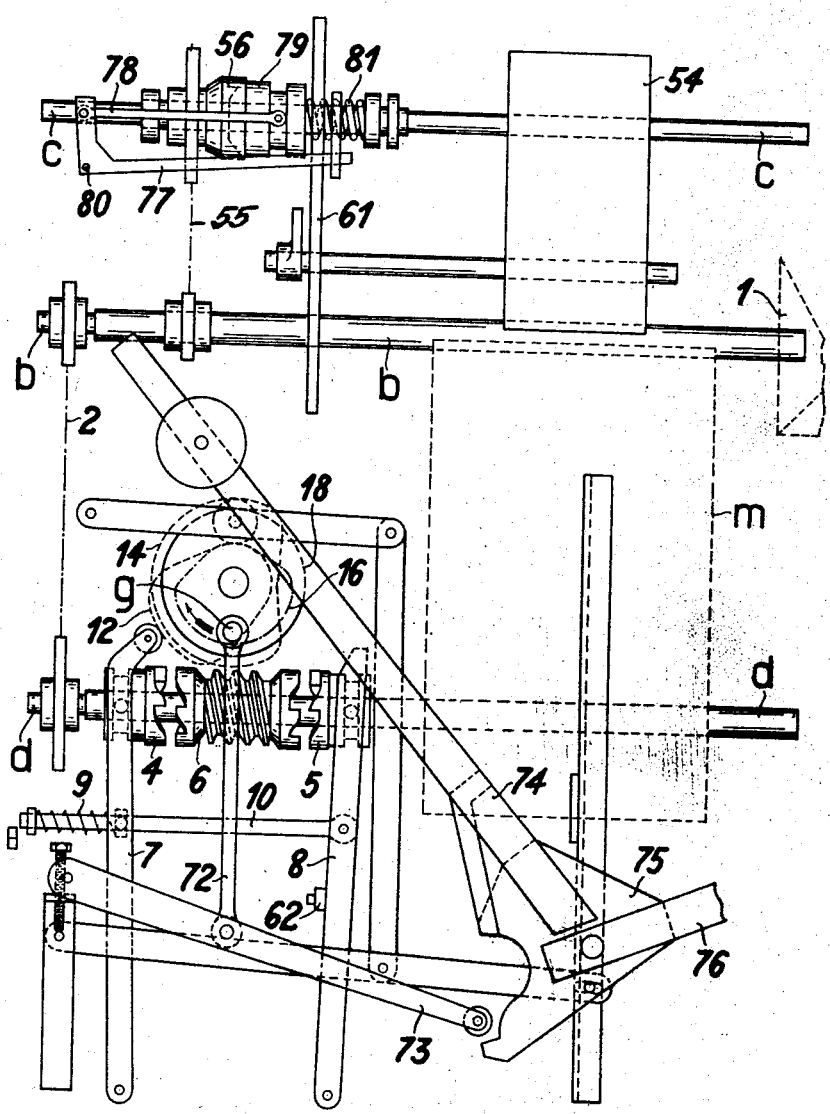
Figure 3 is a portion of Fig. 2 seen from the right.

The whole machine is driven, as already stated, by the main shaft $a$, which, by means of the bevel wheels 1 shown in Figure 3, continuously drives the counter shaft $b$ and through this latter by means of the chain drive 2 the worm shaft $d$. The third wheel 3 which serves to keep the chain 2 tight is shown in Figure 2.

On the worm shaft $d$ are mounted the two clutches 4 and 5 (see Figure 3), between which the loose worm is mounted with free play between the clutches 4 and 5.

The clutches 4 and 5 are movable longitudinally on the shaft $d$, but are coupled thereto and rotate continuously therewith. They are carried in forks 7 and 8, on which by means of a rod 10 which is under the action of a spring 9 (see Figure 3) a force is constantly exerted in a direction which tends to throw the clutches into operation. Their normal position, that is to say when they are disconnected from the worm 6, is produced in the case of the clutch 4 by the cams 12 and 13 mounted on the cam shaft and in the case of the clutch 5 by bolts 48 and 62, as can be seen from Figures 2 and 3.

It should be pointed out here and now that the connection of the worm shaft $d$ to the worm 6 takes place in such a way that the clutch 5 first engages with the worm 6, then after the cam shaft has rotated a short distance further the clutch 4 is released by the cams 12 and 13, so that it likewise engages with the worm 6 under the pressure of the spring and causes the worm to rotate further.

Into the teeth of the worm 6 gears a worm wheel 11, which is mounted fast on the cam shaft $e$. If therefore the worm 6 be coupled to the continuously revolving shaft $d$ for a definite time, the worm wheel 11 and with it the cam shaft $e$ will be rotated for the same length of time.

On the cam shaft $e$ are mounted the cams 12 and 13, 14 and 15, 16 and 17, also the disc cams 18 and 19 and the crank pin $g$. The shape of the various cams, of which the pairs mentioned are in each case of the same shape, is shown together in Figure 3, and represented by different kinds of lines.

The cams 12 and 13 control the movements of the fork 7, and therefore the connection of the clutch 4 with the worm 6, also the disconnection of the worm 6 which subsequently follows, whereby the movement of the worm wheel 11 and through it that of the cam shaft $e$ is then terminated.

The cams 14 and 15 throw the charging devices for the two weighing receptacles $l$ and $m$ into operation.

The cams 16 and 17 are provided for the operation of the discharging devices of the two weighing receptacles $l$ and $m$.

On the several cams run rollers, which are carried in forks. Their shape is shown on the right hand part of Figure 2. On the left hand part of Figure 2 the forks have been omitted for the purpose of rendering the drawing clearer.

The disc cams 18 and 19 with their crank pins $g$, effect through the system of rods $h$ the movement of the discharging doors $i$ of the stirring receptacle $f$ (see Figure 1). Additional description will be given hereinafter of this apparatus and its operation.

Figure 4:
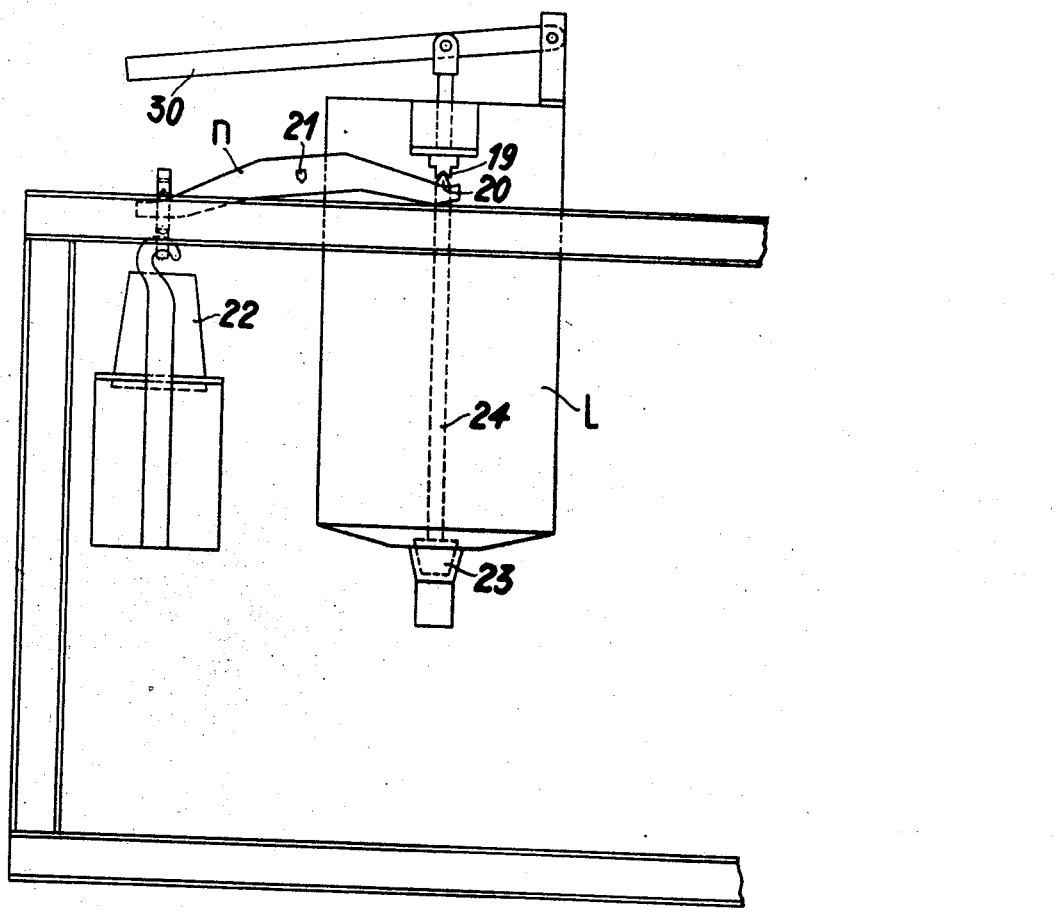
Figure 4 is a front elevation of a portion of the apparatus.

Of the two receptacles $l$ and $m$ the one intended for the reception of the acid is shown in Figure 2 on the left, that for the phosphate on the right in dotted lines. Their form can be clearly seen in Figures 4 and 5. Both receptacles slide in framelike frameworks, and both are held in their upper positions when empty by the counterweights 22 and 53 which are carried on the scale beams $n$ and $o$.

The receptacle $l$ is suspended by a plane 19 on a knife edge 20 on the scale beam $n$. Its point of rotation is denoted by 21. On its other side is mounted the counterweight 22, which is equal to the weight of the receptacle $l$ increased by the weight of the acid which is to be used for the mixture.

The receptacle $l$ consists of a lead lined box. The acid is supplied to it through a pipe 25 of lead, which can be shut off before it opens into the weighing receptacle $l$ by two specially constructed lever valves 31 and 32. These two valves are so connected to the apparatus, that one of them begins to cut off the supply of acid to the receptacle somewhat sooner than the other, and that for the purpose of adjusting the weight of the acid as accurately as possible and also to secure the advantage of the double cut off of the acid pipe. These valves are opened by the cam shaft $e$ through the cams 15, but are closed by a releasing device operated by the weighing apparatus.

The cam 15 corresponds to the cam 14 situated on the right and has the same parts, namely a roller carried in a fork and a system of downwardly extending rods. As stated above, for the sake of rendering the drawing clearer, these parts are not shown in the left hand side. Only a bar 33 can be seen, which is shown as broken away towards the top.

This bar carries a lug 34, and there also rotates on it an approximately three-cornered flat iron 35 on its pivot pins 36. This flat iron 35, which has a counterweight 37, has a nose 38, on which a roller 39 bears, which latter is carried on a bar 40 connected to the valves 31, 32.

Figures 2 and 3 show the apparatus with the cam shaft $e$ at rest, that is to say the receptacles are just filled. It can therefore be easily seen that when the bars 35 and 40 are in the position shown here acid flows through the opened valves 31, 32 into the weighing receptacle $l$, and that as soon as a sufficient quantity of acid has run in, the valves must be shut off. This is effected firstly by their being partially closed by the slow descent of the receptacle $l$ which takes place first while it is being tared and then by their being completely closed after the maximum weight has been obtained. The first operation is affected by a fork 41 mounted on the receptacle $l$ and connected to an angle iron 42 which is connected to the valve 31. The valve 31 will therefore be first partially closed on the descent of the receptacle $l$, In the meantime a pin or spike 43 (see Figure 2) carried on the receptacle *l* has drawn down a lever provided with a hook 44, so that a catch 46 mounted on the lever 45 is released, whereby the lever 45, which is counterbalanced, can swing outwards. With its lower part 47 it pushes a horizontal slide 48 towards the left. This pushes the flat iron 35 to one side, whereby its nose 38 releases the rod 40 and allows it to descend. As it descends the rod 40 effects through the angle iron 49, which is connected to valve rods the complete closing of the valves 31 and 32, so that the flow of the acid is shut off.

At the same time however the horizontal slide 48 has released the fork connection 8 (see Figure 3) for the acid receptacle *l*. The slide 48 consequently no longer prevents the shaft *d* from being connected by the clutch 5 to the cam shaft *e* and the cams mounted on the cam shaft *e* come into operation.

The shaft *d* is coupled to the cam shaft *e* only when the phosphate receptacle *m* has attained it proper weight and has in its turn withdrawn a similar device for the release of the fork coupling 8, namely the bolt 62 from its locking position. After a brief rotation of the cam shaft *e* the clutch 4 is released by the cams 12 and 13 and engages under the action of the pressure of the spring in the worm 6. When the cam shaft *e* rotates the cam 17 effects the emptying of the receptacle *l* and in the following way.

The weighing receptacle carries at the bottom a leaden valve 23 (see Figure 4) which may terminate in a discharge spout. Through the middle of the cover of the receptacle passes a lead covered rod 24, which lifts the valve 23 in the bottom of the receptacle *l*. At one side thereof is placed the inlet pipe 25 for the acid (see Figure 2).

As is also shown in Figure 2, there lies in the fork 26 on the cam 17 a roller 27. The fork 26 catches under an angularly shaped lever 29, which can be rotated about a bolt 28 mounted in the framework of the apparatus. The lever 29 catches, as soon as it is lifted by the cam 17, under a lever 30 connected to the rod 24, lifts it and thus effects the lifting of the valve 23 in the bottom of the receptacle *l*.

On its further rotation the cam 17 allows the roller 27, the lever 29 and with it the rod 24 with the valve 23 to return to their former position again, so that the valve 23 is once more closed.

In the meantime the emptied receptacle has again ascended owing to the action of the counter weight 22. At the same time the fork 41 rotates the bent lever 42 and causes the valve 31 to open slowly.

During the same period of time the cam 15 has also lifted the bar 33, the hooked iron 35 of which has again engaged the roller 39. The rise of the bar 33 lifts the rod 40 and consequently completely opens the valves 31, 32.

In the meantime however, the cam 13 has also been in operation, bringing through a pin or spike mounted on it, the lever 45 again into the position shown in Figure 2, so that the lever 44, which is rotated upwards by means of the pin 43 mounted on the receptacle *l* again catches with its nose under the catch 46. At the same time the lever 47 has moved the horizontal slide 48 towards the right and by pushing it into the fork coupling 8 has ensured the disconnection of the clutch 5, which had taken place just beforehand by means of the cams 12 and 13. The further movement of the worm 6 and thereby that of the cam shaft *e* now takes place, after the receptacle *l* has returned to its upper position, only by the agency of the clutch 4, and that until the cam shaft has completed one revolution and at the last moment of its operation disconnects by means of the cams 12 and 13 the clutch 4 from the work 6 after which the cam shaft *e* is again brought to rest.

The details of the parts connected with the cam 13 are not shown in Figure 2. They can be clearly seen on the right hand side of the drawing with the cam 12. They will be fully described hereinafter. The chief point in the present case was, to fully explain the operation of the left hand part of the apparatus, that is to say to portray a complete working.

With regard to the phosphate meal receptacle *m* and its working the following facts should be stated. Its suspension (see Figure 5) is the same as that of the receptacle *l* namely by a plane 50 and knife edge 51 from the scale beams *o* the pivot point of which is at 52. The counterweight 53 is also formed in the same way here.

The supply of the phosphate meal to the receptacle *m* is effected from a cast iron receptacle 54 (see Figures 2 and 3) by means of a revolving bladed wheel. This wheel is mounted on the shaft *c* which is connected by a chain wheel and a chain 55 to the counter shaft *b*. The chain wheel runs loosely on the shaft *c* and can be coupled to it by a friction clutch 56. The throwing into operation of the clutch and the subsequent opening of a throttle valve 64 (see Figure 2) which closes the charging shoot at the bottom is effected by the cam 14 carried on the cam shaft *e*. The clutch is thrown out of operation and the supply of the phosphate meal stopped independently of the cam shaft by the releasing device operated by the weighing apparatus and moreover by the same arrangement as in the case of the acid receptacle *l*, a pin or spike 57 mounted on the receptacle m (see Figure 2) drawing down a lever 58 by its left hand part and releasing a catch 59, thereby allowing a lever 60, likewise counterweighted, to swing outwards, which thus causes the system of rods 61 to descend.

At the same time a horizontal slide 62 is also drawn out of the path of the clutch fork 8 here, to enable it in its turn to throw the clutch 5 into operation and thereby set the cam shaft e in motion.

When the rod 61 drops, it carries a lever 63 with it which rotates the flap valve 64 of the body 54 and so cuts off the supply of the phosphate meal. At the same time it has also disconnected the clutch 56 (see Figure 3) and thrown the shaft c out of operation. The rod 61 is as a matter of fact connected to one arm of a double armed lever 77 which oscillates about a fixed bolt 80 and to the other arm of which a rod 78 is pivoted. The rod 78 is connected to a clutch sleeve 79, which is mounted to move longitudinally on the shaft c but cannot rotate relatively thereto. When the rod 61 descends the lever 77 is rotated in a clockwise direction. When this takes place, the clutch sleeve 79 is brought out of engagement with the part 56 of the clutch by the rod 78 against the action of a spring 81, the said part 56 of the clutch being rigidly connected to the loose chain wheel.

The receptacle m for the phosphate meal has at the bottom a slightly contricted part 65, the discharge door 66 of which is kept closed on either side by a lever 67 provided with a counterweight. The two levers are firmly screwed to each other by a bolt. The discharging door is opened by the cam 16 which is carried on the cam shaft e and lifts the counterweight of the door 66 by means of the lever 68 and to such a height always as was previously arranged for. The cam 16 is so constructed that the door 66 is always opened wide before the counterweights close it again, in order to make sure that all the phosphate has been let out. When the emptying of the receptacle has been completed, it ascends again under the action of the counterweight 53, whereby the lever 58 and the catch are again brought into their original position, and the slide 62 also at the same time pushed towards the left.

In the meantime the cam 14 has acted in a manner similar to the cam 15 and lifted the rod 61, whereby the flap valve 64 is again opened and the outlet from the receptacle is opened.

Immediately after this the cam 14 also throws the clutch 56 into action consequently setting the shaft c in motion and setting the meal delivery wheel in action. The supply of meal can therefore begin again.

It is also necessary to describe the construction of the apparatus belonging to the cam 12. On this cam 12 runs, in a fork 69, which terminates at the bottom in a double rod 70, a roller as in the case of the other cams. On the rod 70 is carried a pin 71, which lifts the lever 60 into the position shown in Figure 2.

As has been already stated in the first part of the specification, the cam shaft e also sets the devices for opening and closing the stirring receptacle f in operation. Their shape is shown in Figure 3, the crank pin g acting by means of a rod 72 on a lever 73, the free end of which engages in a recess in a cam 75 mounted on the lever 74 and moving the lever 74 to the right or left according to the position of the pin g. On the right hand arm 76 of this lever is fixed the system of rods h (see Figure 1) which leads to the closing door i so that this door i is here opened or closed.

The ascending counterweighted lever is made comparatively long, because the movement of the heavy door requires a correspondingly large amount of power.

The working of the above described apparatus takes place in such a way that the meal delivery apparatus and the acid pipe simultaneously deliver phosphate meal and acid to the corresponding weighing receptacle, which at this time are closed at the bottom. As soon as the two scales are in equilibrium, the releasing device of each comes into action which shuts off the delivery of the phosphate meal and acid and at the same time couples up the worm gear, which in its turn sets the cam shaft in motion. As the first task which it performs, the cam shaft effects, by means of the disc cam mounted on it and the system of levers operated by the crank pin, the closing of the discharge door at the bottom of the stirring receptacle. By means of the other cams mounted on the cam shaft the opening of the discharge door of the meal weighing receptacle and the valve in the bottom of the acid weighing receptacle is first effected. After the two materials have been emptied into the stirring receptacle the discharging door and the acid valve are again closed by the same cams. In the meantime the meal and the acid in the stirring receptacle are thoroughly mixed together. As soon as this has taken place to a sufficient extent, the disc cam on the cam shaft again acts to open the stirring receptacle.

In the meantime a further pair of cams on the cam shafts have thrown the clutch of the meal delivering apparatus into operation and the valve for shuting off the acid open.

A last pair of cams has during this time again set the releasing devices in action and by means of the bolts in connection therewith has disconnected the first clutch thrown into operation. At the last moment of the rotation of the cam shaft the same cams disconnect the clutch last thrown into action. The original point has now been reached again at which the meal delivery apparatus is driven by the counter shaft and the meal and acid are run into their respective weighing receptacles until the weighing devices are once more in equilibrium and the succession of operations are again repeated as above described.

Having thus described my invention what I claim is:

1. An automatic weighing apparatus for fluent substances, including liquids, comprising a driving mechanism, a plurality of weighing receptacles, means for controlling the charging and discharging of such receptacles, means for temporarily connecting said driving mechanism to said charging and discharging controlling means, and mechanism operated by the movement of such receptacles when filled and empty for controlling the said connecting means.

2. An automatic weighing apparatus for loose fluent substances including liquids, comprising a driving mechanism, a plurality of weighing receptacles, means for controlling the charging and discharging of such receptacles, a cam shaft having suitable cams mounted thereon, a shaft adapted for connection with said cam shaft and bearing a loose worm and a clutch mechanism for engaging said cam shaft with said driving mechanism and means controlled by the weighing receptacles for operating said clutch mechanism.

3. An automatic weighing apparatus for fluent substances including liquids, comprising a driving mechanism, a plurality of weighing receptacles, discharging valves for said receptacles, a cam shaft having cams for opening and closing said discharge valves and controlling mechanism operated by the movement of the weighing receptacles to effect the opening of the discharge valves by such controlling mechanism and two clutches and a loose worm for connecting said cam shaft with said driving mechanism one clutch being dependent on the weighing receptacles and the other clutch being merely dependent on a cam mounted on the cam shaft.

4. An automatic weighing apparatus for fluent substances including liquids, comprising a driving mechanism, a plurality of weighing receptacles, means for controlling the discharge of said receptacles, a stirring receptacle, discharging doors for same and means connecting said discharging doors with said controlling means for the discharge of the weighing receptacles whereby the said doors remain closed during the discharging of the weighing receptacles and remain open up to the commencement of a fresh emptying of the weighing receptacles.

The foregoing specification signed at Germany.

Dr. G. A. BRUHN.

In presence of—
 HEINRICH NAGEL,
 MINNE WENZEL.